(12) United States Patent
Taleb-Bendiab (10) Patent No.: US 9,731,645 B1
(45) Date of Patent: Aug. 15, 2017

(54) COOPERATIVE ADAPTIVE LIGHTING SYSTEM USING VEHICLE TO TARGET OR OBJECT COMMUNICATION

(71) Applicant: Valeo North America, Inc., Troy, MI (US)

(72) Inventor: Amine Taleb-Bendiab, Ann Arbor, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/093,240

(22) Filed: Apr. 7, 2016

(51) Int. Cl.
- *B60Q 1/02* (2006.01)
- *B60Q 1/14* (2006.01)
- *H05B 37/02* (2006.01)
- *B60Q 1/20* (2006.01)
- *G01S 19/13* (2010.01)

(52) U.S. Cl.
CPC .............. *B60Q 1/143* (2013.01); *B60Q 1/20* (2013.01); *G01S 19/13* (2013.01); *H05B 37/0227* (2013.01); *H05B 37/0254* (2013.01); *H05B 37/0272* (2013.01); *B60Q 2300/31* (2013.01); *B60Q 2300/32* (2013.01); *B60Q 2300/42* (2013.01); *B60Q 2300/45* (2013.01)

(58) Field of Classification Search
CPC .. B60Q 1/1407; B60Q 1/1415; B60Q 1/1423; B60Q 1/143
USPC ........ 315/76–77, 82; 362/459–460, 464–466
See application file for complete search history.

(56) References Cited

U.S. PATENT DOCUMENTS

| | | | |
|---|---|---|---|
| 6,774,988 B2 * | 8/2004 | Stam | B60Q 1/1423 250/208.1 |
| 7,567,864 B2 | 7/2009 | Ziehr et al. | |
| 8,538,636 B2 * | 9/2013 | Breed | B60N 2/002 315/77 |
| 9,150,146 B2 | 10/2015 | Bae | |
| 2004/0143380 A1 * | 7/2004 | Stam | B60Q 1/085 701/36 |
| 2007/0142988 A1 | 6/2007 | Ziehr et al. | |
| 2009/0016073 A1 * | 1/2009 | Higgins-Luthman | B60Q 1/085 362/465 |
| 2012/0299478 A1 * | 11/2012 | Park | B60Q 1/143 315/82 |
| 2012/0314434 A1 * | 12/2012 | Park | B60Q 1/143 362/465 |

(Continued)

FOREIGN PATENT DOCUMENTS

| DE | 102007010291 A1 | 9/2008 |
|---|---|---|
| DE | 102009046827 A1 | 5/2011 |

(Continued)

*Primary Examiner* — Jason M Crawford
(74) *Attorney, Agent, or Firm* — Jacox, Meckstroth & Jenkins (57) ABSTRACT

A cooperative adaptive lighting system for motor vehicles in which a vehicle transmits its geographic coordinates and receives similar coordinates from other vehicles, pedestrians, and stationary warning devices. Using the coordinates, the vehicle computes distances, and relative position more specifically, to those entities. When the distances become sufficiently small, indicating that the entities fall within headlight range, the vehicle alters its headlight beams to either (1) throw more light on an entity, (2) reduce light reaching the entity as appropriate, or (3) change a lighting pattern as appropriate.

51 Claims, 5 Drawing Sheets

(56) References Cited

U.S. PATENT DOCUMENTS

| | | | |
|---|---|---|---|
| 2013/0320193 A1* | 12/2013 | Liken | H01L 27/146 250/208.1 |
| 2014/0177243 A1* | 6/2014 | Noh | B60Q 1/143 362/466 |
| 2015/0145411 A1 | 5/2015 | Bae | |

FOREIGN PATENT DOCUMENTS

| | | |
|---|---|---|
| DE | 102012100463 A1 | 7/2013 |
| DE | 102012024148 A1 | 6/2014 |
| DE | 102013212011 A1 | 1/2015 |
| JP | 2006185138 A | 7/2006 |
| JP | 2008242579 A | 10/2008 |
| JP | 2014119778 A | 6/2014 |
| KR | 100410936 B1 | 12/2003 |
| KR | 20050054161 A | 6/2005 |

* cited by examiner

COOPERATIVE ADAPTIVE LIGHTING SYSTEM USING VEHICLE TO TARGET OR OBJECT COMMUNICATION

BACKGROUND OF THE INVENTION

1. Field of the Invention

This invention relates to a cooperative adaptive lighting system using a vehicle-to-vehicle, vehicle-to-infrastructure, vehicle-to-pedestrian, vehicle-to-target or other vehicle-to-object (hereinafter collectively referred to as V2X) communication.

2. Description of the Related Art

In the past, various approaches have been used to control headlights which are also known as headlamps on vehicles. For example, a typical solution was to use a camera-based adaptive headlamp, also known as adaptive driving beam (ADB) or a glare-free headlamp. The headlamps' lights change lighting shape and intensity distribution profile based on oncoming or preceding vehicles or possibly upon the detection of a pedestrian, all of which is captured by the camera. In many countries, especially in Europe, advanced driving beams are regulated and it is anticipated that they will soon be regulated in the United States.

There are various disadvantages of some of the prior art approaches which include poor distance accuracy with a camera, which is typically a mono-camera, in particular at higher vehicle speeds. Accurate distance measurements are critical for headlamp ADB, and with camera systems of the past, such accuracy was generally not obtained.

Another problem with prior art camera systems is that ADB camera systems would only detect objects within its field of view.

Specific to pedestrians, at night, if the pedestrian is in a zone of poor lighting, the pedestrian might not be detected by a camera system at all, which may lead to a dangerous or hazardous condition for the pedestrian.

There is, therefore, a need to provide an improved system and method that overcomes one or more of the problems of the prior art.

SUMMARY OF THE INVENTION

One object of the invention is to provide a comparative adaptive exterior lighting system and method using V2X communication.

Another object of the invention is to provide an accurate distance measurement for controlling and enhancing an accurate headlamp beam shape and light intensity.

Another object of the invention is to provide at least one or a plurality of telematics control units that are adapted to detect objects equipped with similar telematics control units in a predetermined range, such as in a 360 degree field-of-view fashion. Another object of the invention is to provide a telematics control unit that is configured and adapted to accurately measure distances between a vehicle and another vehicle, target, pedestrian, object or infrastructure in order to control a headlamp assembly in response thereto, thereby enhancing accurate beam shaping and generation and intensity.

Another object of the invention is to provide a V2X application that provides position accuracy of 1.5 meter or better and communication ranges of at least 300 meters.

Yet another object of the invention is to provide a V2X that can reactively sense other telematics units or systems and adapt a headlamp light beam in response thereto.

Still another object of the invention is to provide a lighting system that enhances the lighting directed toward a pedestrian when the pedestrian has a Telematics Control Unit (TCU) or equipment such as a cellular phone, i.e. smartphone, that is equipped with a compatible wireless communication module or similar device adapted to communicate with the vehicles telematics control unit.

Still other advantages include:

Adaptation of lighting, in particular headlamp, as vehicle is approaching entry to an area where illumination is desired, such as a tunnel or a city.

Adaptation of lighting, headlamp and rear lights hazard lights, fog lamps, due to approach to adverse weather, rain, fog, snow and icy road.

Adaptation of lighting, headlamp and/or hazard lights in areas with an active wild animal crossing.

During daytime, switch on of Daytime Running Lamp (DRL), only during the approach of another vehicle, including cars, trucks, motorcycles, as long as all of these are equipped with a V2X TCU using compatible wireless communication standard. This would lead to energy saving, by not having it on at all times.

Adaptation of overall, front and rear lighting intensity, depending on the distance of the target car versus other vehicle detected through V2X communication.

In one aspect, one embodiment of the invention comprises a cooperative adaptive lighting system for use in a first vehicle comprising a transmitter which transmits first data which indicates a location of the first vehicle, a receiver which receives second data which indicates a location of at least one of a second vehicle, a pedestrian or an infrastructure, and a computer which computes a parameter A between the first vehicle and the at least one of second vehicle, the pedestrian or the infrastructure, and when the parameter A falls below a first predetermined threshold T1, induces alteration of a headlight or headlamp beam projected by the first vehicle.

In another embodiment the parameter of the infrastructure does not need to be computed because the infrastructure broadcast messages: as in Signal Phase and Time (SPAT) or Warning message about an event, such as weather condition at a certain parameter. With the understanding that the infrastructure is equipped with a TCU using compatible communication standard to vehicle TCU, when the parameter A received by the vehicle falls below a first predetermined threshold T1, induces alteration of a headlight or headlamp beam projected by the first vehicle.

In another aspect, another embodiment of the invention comprises a cooperative adaptive lighting system for use in a first vehicle, comprising a first telematics control unit which transmits first data which indicates a location of the first vehicle, the first telematics control unit receiving at least one of a data A indicating location of an entity A, a data B indicating location of an entity B, or a data C indicating location of an entity C, wherein at least one of the entities A, B and C will be encountered by the first vehicle, and wherein the first telematics control unit computes at least one of a parameter A to the entity A, a parameter B to the entity B, or a parameter C to the entity C and the first telematics control unit including a headlight beam projected by the first vehicle in response thereto and causes at least one of the following alterations: a beam headlight alteration A when the parameter A falls below a threshold A, a beam headlight alteration B when the parameter B falls below a threshold B, or a beam headlight alteration C when the parameter C falls below a threshold C.

In still another aspect, another embodiment of the invention comprises a cooperative adaptive lighting system for use in a first vehicle, comprising a first telematics control unit which ascertains first (X, Y) coordinates of the first vehicle and transmits the coordinates for reception by other vehicles, a second telematics control unit which receives second (X, Y) coordinates indicating location of a second vehicle, computes a parameter between the first vehicle and the second vehicle, and when the parameter falls below a first predetermined threshold, induces a change in illumination produced by lighting in the first vehicle.

In still another aspect, another embodiment of the invention comprises a cooperative adaptive exterior lighting system for use on a first vehicle comprising an adaptive exterior lighting system, a control system for controlling operation of the adaptive exterior lighting system, comprising a transmitter which transmits first data which indicates a location of the first vehicle, a receiver which receives second data which indicates a location of a second vehicle, and a computer which computes a parameter A between the first vehicle and the second vehicle, and when the parameter A falls below a first predetermined threshold T1, induces alteration of a headlight or headlamp beam projected by the adaptive exterior lighting system.

In another aspect, another embodiment of the invention comprises a cooperative adaptive lighting system for use in a first vehicle comprising a transmitter which transmits first data associated with the first vehicle, a receiver which receives second data associated with at least one of a second vehicle, a pedestrian or an infrastructure, and a computer which computes a parameter A for the first vehicle and the at least one of a second vehicle, the pedestrian or the infrastructure using at least one of the first data or the second data, and when the parameter A falls below a first predetermined threshold T1, induces alteration of a headlight beam projected by the first vehicle.

In still another aspect, another embodiment of the invention comprises a cooperative adaptive lighting system for use in a first vehicle, comprising a first telematics control unit which transmits first data which indicates a location of the first vehicle the first telematics control unit receiving at least one of a data A indicating location of an entity A, a data B indicating location of an entity B, or a data C indicating location of an entity C, wherein at least one of the entities A, B and C will be encountered by the first vehicle, and wherein the first telematics control unit computes at least one of a parameter A to the entity A, a parameter B to the entity B, or a parameter C to the entity C, the first telematics control unit including a headlight beam projected by the first vehicle in response thereto and causes at least one of the following alterations a beam headlight alteration A when the parameter A falls below a threshold T1, a beam headlight alteration B when the parameter B falls below a threshold T2, or a beam headlight alteration C when the parameter C falls below a threshold T3.

In yet another aspect, another embodiment of the invention comprises a cooperative adaptive lighting system for use in a first vehicle, comprising a first telematics control unit which ascertains first coordinates (X, Y) associated with the first vehicle and transmits coordinates for reception by other vehicles, a second telematics control unit which receives second coordinates (X, Y) associated with a second vehicle, computes a parameter for the first vehicle and the second vehicle using the first coordinates (X, Y) and the second coordinates (X, Y), and when the parameter falls below a first predetermined threshold, induces a change in illumination produced by lighting in the first vehicle.

In still another aspect, another embodiment of the invention comprises a cooperative adaptive exterior lighting system for use on a first vehicle comprising an adaptive exterior lighting system, a control system for controlling operation of the adaptive exterior lighting system, comprising a transmitter which transmits first data associated with the first vehicle, a receiver which receives second data associated with a second vehicle, and a computer which computes a parameter A for the first vehicle and the second vehicle using the first data and the second data, and when the parameter A falls below a first predetermined threshold T1, induces alteration of a headlight beam projected by the adaptive exterior lighting system.

This invention, including all embodiments shown and described herein, could be used alone or together and/or in combination with one or more of the features covered by one or more of the following list of features:

The cooperative adaptive lighting system wherein the cooperative adaptive lighting system creates at least two different light beam distributions following communication between the first vehicle and the at least one of second vehicle, the pedestrian or the infrastructure.

The cooperative adaptive lighting system wherein the parameter A is a distance.

The cooperative adaptive lighting system wherein the parameter A is at least one of a time, an entry of a proximity zone, a strength of a signal, or a state of a vehicle.

The cooperative adaptive exterior lighting system wherein the first data indicates a location of the first vehicle.

The cooperative adaptive exterior lighting system wherein the second data indicates a location of the second vehicle.

The cooperative adaptive exterior lighting system wherein the first data indicates a location of the first vehicle.

The cooperative adaptive exterior lighting system wherein the second data indicates a location of the second vehicle.

The cooperative adaptive lighting system wherein the receiver receives third data from a stationary transmitter which indicates a location of a road hazard or infrastructure condition; and the computer computes a parameter B between the first vehicle and the road hazard or infrastructure condition and induces alteration of a headlight beam projected by the first vehicle when the parameter B falls below a second predetermined threshold T2.

The cooperative adaptive lighting system wherein the receiver receives fourth data from a mobile transmitter associated with a pedestrian which indicates a location of the pedestrian; the computer computes a parameter C between the first vehicle and the pedestrian and induces alteration of a headlight beam projected by the first vehicle when the parameter C falls below a third predetermined threshold T3.

The cooperative adaptive lighting system wherein the transmitter is a radio transmitter.

The cooperative adaptive lighting system wherein the mobile transmitter is a cellular phone or other dedicated wearable device. It should also be understood that the radio transmitter in cell phone could be DSRC or other type of wireless, not necessarily cellular.

The cooperative adaptive lighting system wherein the alteration comprises increasing illumination, through increased intensity and/or light beam reforming, which strikes the pedestrian.

The cooperative adaptive lighting system wherein the second vehicle approaches the first vehicle and the alteration comprises reducing light, through decreased intensity and/or light beam reforming, which strikes the second vehicle.

The cooperative adaptive lighting system wherein the first vehicle and the second vehicle both travel in a same direction, with the first vehicle behind the second vehicle, and the alteration comprises reducing light which strikes the second vehicle.

The cooperative adaptive lighting system wherein the first data identifying the location of the first vehicle is obtained from an artificial earth satellite.

The cooperative adaptive lighting system wherein each of the first vehicle, the at least one of second vehicle, the pedestrian or the infrastructure are equipped with a telematics control unit.

The cooperative adaptive lighting system wherein the second data is received from a government emergency vehicle and the cooperative adaptive lighting system re-transmits the second data for receipt by additional vehicles.

The cooperative adaptive lighting system wherein the beam headlight alteration A is different from the beam headlight alteration B, which is different from the beam headlight alteration C.

The cooperative adaptive lighting system wherein the entity A is a pedestrian and the beam headlight alteration A comprises projecting an additional illumination toward the pedestrian.

The cooperative adaptive lighting system wherein the entity B is a nearby vehicle, and the beam headlight alteration B comprises reducing an illumination projected toward the nearby vehicle.

The cooperative adaptive lighting system wherein the entity B is an approaching vehicle.

The cooperative adaptive lighting system wherein the entity B is a vehicle located ahead of the first vehicle and both vehicles travel in the same direction.

The cooperative adaptive lighting system wherein the entity C is a road hazard or driving condition, and the beam headlight alteration C comprises projecting additional illumination toward the road hazard or driving condition.

The cooperative adaptive lighting system wherein the entity C is a road hazard or driving condition, and the beam headlight alteration C comprises reducing illumination projected toward the road hazard or driving condition.

The cooperative adaptive exterior lighting system wherein the first coordinates (X, Y) indicates a location of the first vehicle.

The cooperative adaptive exterior lighting system wherein the second coordinates (X, Y) indicates a location of the second vehicle.

The cooperative adaptive lighting system wherein the change in illumination reduces light projected toward eyes of a driver of the second vehicle.

The cooperative adaptive exterior lighting system wherein the parameter A is a distance.

The cooperative adaptive exterior lighting system wherein the parameter A is at least one of a time, an entry of a proximity zone, a strength of a signal, or a state of a vehicle.

The cooperative adaptive exterior lighting system wherein the first data indicates a location of the first vehicle.

The cooperative adaptive exterior lighting system wherein the second data indicates a location of the second vehicle.

The cooperative adaptive exterior lighting system wherein the receiver receives third data from a stationary transmitter which indicates a location of a road hazard or driving condition; and the computer computes a parameter B between the first vehicle and the road hazard and induces alteration of a headlight beam projected by the first vehicle when the parameter B falls below a second predetermined threshold T2.

The cooperative adaptive exterior lighting system wherein the receiver receives fourth data from a mobile transmitter associated with a pedestrian which indicates a location of the pedestrian; the computer computes a parameter C between the first vehicle and the pedestrian and induces alteration of a headlight beam projected by the first vehicle when the parameter C falls below a third predetermined threshold T3.

The cooperative adaptive exterior lighting system wherein the alteration comprises increasing illumination which strikes the pedestrian.

The cooperative adaptive exterior lighting system wherein the second vehicle approaches the first vehicle and the alteration comprises reducing light which strikes the second vehicle.

The cooperative adaptive exterior lighting system wherein the first vehicle and the second vehicle both travel in a same direction, with the first vehicle behind the second vehicle, and the alteration comprises reducing light which strikes the second vehicle.

The cooperative adaptive exterior lighting system wherein the first data identifying the location of the first vehicle is obtained from an artificial earth satellite.

The cooperative adaptive lighting system and further comprising a second receiver which receives additional data, which may be redundant to the second data, which additional data indicates a location of at least one of the second vehicle, a pedestrian or an infrastructure, in which the computer uses the additional data to compute or verify parameter A.

These and other objects and advantages of the invention will be apparent from the following description, the accompanying drawings and the appended claims.

DETAILED DESCRIPTION OF THE PREFERRED EMBODIMENTS

Figure 1:
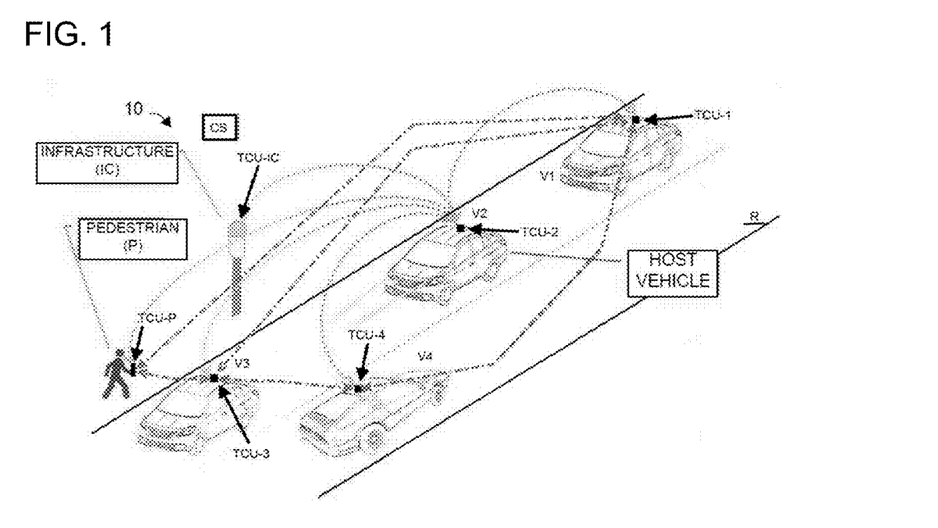
FIGS. 1, 3, 4, 5, and 6 illustrate scenarios in which the invention operates, and the altered headlight beam which is generated for each scenario.

FIG. 1 illustrates a cooperative adaptive lighting system 10 having four vehicles V1, V2, V3, and V4 on a roadway R, and a pedestrian P near the road. An infrastructure component IC is also located near the road R. The vehicles V1-V4 are equipped with Telematics Control Units (TCU)

20 (FIG. 2) described later herein, namely TCU-1-TCU-4, respectively, which may comprise computers, cell phones, pad-computers, and the like, together with transmitting and receiving antennas (shown in FIG. 2). The pedestrian P is equipped with a TCU device, which could a smartphone with compatible transmit radio and positioning capability and a dedicated wearable V2X transmitter, designated as TCU-P, but it should be understood that the TCU-P could simply be a transmitter, and the infrastructure component IC is equipped with a TCU, designated as TCU-IC. The TCU may comprise or be an on-board unit (OBU) having the same components. For ease of description and understanding, they will both be referred herein as TCU.

In one embodiment of the invention, all TCU's are identical in structure, although the programming in each may be different, and these structurally identical TCU's may operate differently, depending on their immediate requirements. This arrangement is somewhat analogous to a certain model of cell phones, which can be identical in structure, but can operate differently because of the different application programs contained in each. For the vehicle TCU, a network transceiver, for example CAN transceiver may be necessary to communicate with the given vehicle lighting.

The operation of the TCUs will be illustrated by several examples. In general, each TCU transmits packets of data which contain the following information:

(1) data indicating the geographic location of the TCU, which implicitly indicates the location of its associated entity, such as a vehicle. In the case of the infrastructure component IC, the data may indicate the location of a nearby hazard about which the IC issues warnings, in addition to or rather than indicating the location of the IC itself;

(2) data describing the entity associated with the TCU, such as whether the TCU is a vehicle, pedestrian, or infrastructure component, or data indicating other relevant characteristics, such as the speed of the associated entity, or description of a hazard near the IC; or Signal Phase and Time of a traffic light, or road intersection, and (3) optional information, described below, which may induce additional responses in recipients of the packets.

As a specific example, TCU-2, associated with vehicle V2, may transmit (1) information indicating that its associated entity is a passenger automobile, as opposed to, for example, a passenger tour bus, and (2) information about behavior of vehicle V2, such as the speed of vehicle V2, the location of vehicle V2, or both speed and location.

This location information can take the form of latitude and longitude, derived from a Global Positioning System, GPS, within vehicle V2. The latitude/longitude information can be viewed as (X, Y) coordinates. These (X, Y) coordinates, of course, continually change as vehicle V2 moves. Consequently, the relative distance and relative angle measures similar to FIG. 8, would be relevant parameters for the cooperative adaptive lighting.

At the same time, vehicle TCU-2, in vehicle V2, receives similar information from other TCU's, such as TCU-4, located in vehicle V4. The (X4, Y4) coordinates received from vehicle V4, together with the (X2, Y2) coordinates of vehicle V2, allow vehicle V2 to compute the distance between vehicles V2 and V4. This can be done using the Theorem of Pythagoras, $$D^2=[(X4-X2)^2]+[(Y4-Y2)^2].$$

The angle formed between the two vehicles or objects and the vehicle speed vector is needed as well for headlight light reaim or alteration.

As vehicles V2 and V4 approach each other, the computed distance will decrease. When the distance falls below a first predetermined threshold, TCU-2 issues a command to the headlights of its vehicle V2 to alter the headlights. In one form of the invention, this alteration can take the common approach of reduction from high beams to low beams. In another form of the invention, one or more of the vehicles may be equipped with an adaptive exterior lighting system 30 (FIG. 2) that is adapted and configured to provide the vehicle with a steerable headlight assembly SHA (FIG. 1) that generates steerable headlight beams and those beams can be steered away from the eyes of the driver of the oncoming vehicle V4. It should be understood that steerable would mean that light is not just swiveling left/right or up/down, but also, shape of the beam can change as defined in ADB regulations.

Concurrent with these operations, the TCU-P of the pedestrian P may broadcast his own (X, Y) coordinates, plus an indication that he is a pedestrian. When TCU-2, in vehicle V2, receives that information, it computes the distance to the pedestrian P. When that distance falls below a specific second predetermined threshold, TCU-2 orders the headlights of vehicle V2 to project additional light in the direction of the pedestrian. This direction is known based on simple geometry, using (1) the known (X, Y) coordinates of vehicle V2, (2) the known direction which vehicle V2 is traveling, and (3) the known (X, Y) coordinates of the pedestrian P.

Figure 8:
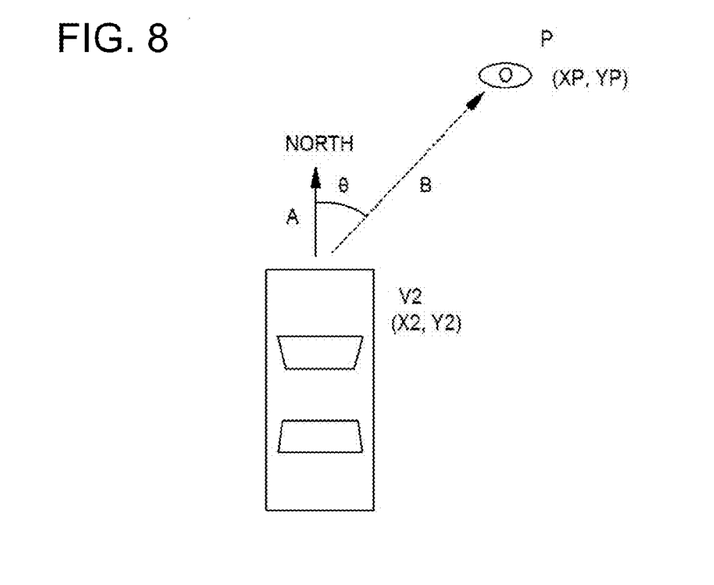
FIG. 8 illustrates computation of an angle theta, in order to shift a headlight beam toward a pedestrian P.

For example, in FIG. 8, vehicle V2 is traveling north. A unit-vector A can be deduced from the direction of vector A (north) plus the coordinates of vehicle V2, namely, (X2, Y2). Vector B can be deduced from the pair of coordinates (X2, Y2) and (XP, YP). The dot product of A and B can produce angle theta, based on the following equation:

$$A \bullet B = (\text{LENGTH } A) \times (\text{LENGTH } B) \times \cos(\text{THETA}).$$

Knowledge of the required THETA allows the headlights to be steered in the direction of THETA, toward pedestrian P.

Concurrent with the preceding operations, the TCU-IC of the infrastructure component IC in FIG. 1 transmits its own (X, Y) coordinates, and an indication that it is an infrastructure component and not a vehicle or pedestrian, for example. This position information, by itself, can be of value in certain cases as it is analogous to mile-markers used on highways.

In addition, the TCU-IC can transmit information of special interest to nearby vehicles. For example, the TCU-IC may be located at a site where deer or other animals are known to frequently cross the roadway R, and the TCU-IC may transmit information indicating the presence of a deer or animal crossing. TCU's in vehicles receiving such information can compute the distances to the infrastructure component IC, and when a vehicle becomes sufficiently close, the TCU's can order the headlights to increase illumination in the direction of the TCU-IC, in order to illuminate any deer or other animals present.

As another example, the infrastructure component IC may be located where standing water can accumulate during rain storms. The TCU-IC can transmit the fact that standing water is present, thereby prompting incoming vehicles to increase or alter headlight illumination. In some situations, this transmission can be undertaken only when standing water is, in fact, present. In this case, no such transmission will occur under dry conditions.

As another example, the TCU-IC may be located at a location where fog can develop. The TCU-IC can transmit the fact that fog is present, thereby prompting incoming vehicles to, for example, reduce or alter headlight illumination or to energize fog lamps on the vehicle.

As yet another example, the TCU-IC can be equipped with local weather information, and can transmit signals indicating whether and how incoming vehicles should alter their lighting in response. For instance, black ice can be present on a bridge, making a warning to vehicles desirable.

The TCU-IC of the infrastructure component IC will not necessarily be located precisely at the position of the hazard about which it transmits warnings. For example, an animal crossing can be located 100 yards away to the north. A water hazard can be located 100 yards away, but in the opposite direction. Therefore, the TCU-IC may transmit the (X, Y) coordinates of the particular hazard, in addition to or rather than its own (X, Y) coordinates. In this case, the (X, Y) coordinates transmitted will change, depending on the hazard which is being announced. The TCU's in the vehicles will direct the headlights, if direction is required, toward the (X, Y) coordinates of the hazard, rather than toward the infrastructure component IC. In another situation, the TCU-IC can transmit both (1) its own (X, Y) coordinates and (2) the (X, Y) coordinates of a hazard.

In one form of the invention, the communication system used should possess at least two important capabilities. Preferably, one capability is that the reception range should be at least 300 meters and that relative position accuracy be less than 1.5 meter. For V2V, or V2P, the relative position accuracy is critical. Cellular frequencies, Bluetooth™, DSRC (Dedicated Short Range Communication, as described by the U.S. FCC, Federal Communication Commission), or 802.11p, and Wi-Fi systems, or 802.11 standards in general, are some examples of applicable wireless communication for V2X.

A second capability is a sufficiently low latency in the range of 25 milliseconds (i.e., $\frac{1}{40}$ second), or less. Latency refers to the time delay between, for example, (1) the issuance of an identification signal by TCU-4 in vehicle V4 and (2) the initiation of a response by vehicle V2 to adjust its headlights. More generally, latency refers to the time delays required for communication between vehicles, such as the delay between (1) transmission of a warning by the TCU-IC and (2) receipt of the warning and computation of a commanded action in response. Latency may, but does not have to include the time required for physical movement of a mechanical device, such as a headlight, which will be much longer than communication delays.

An additional desired capability is that the relative (X, Y) coordinates of moving TCU's be attainable with sufficient accuracy, such as within an error of one meter. Currently available GPS, Global Positioning Systems, combined with relative position measurement techniques, can provide such accuracy. Of course, stationary objects, such as TCU-IC and associated stationary hazards will possess non-changing (X, Y) coordinates and need not rely on GPS.

Figure 2:
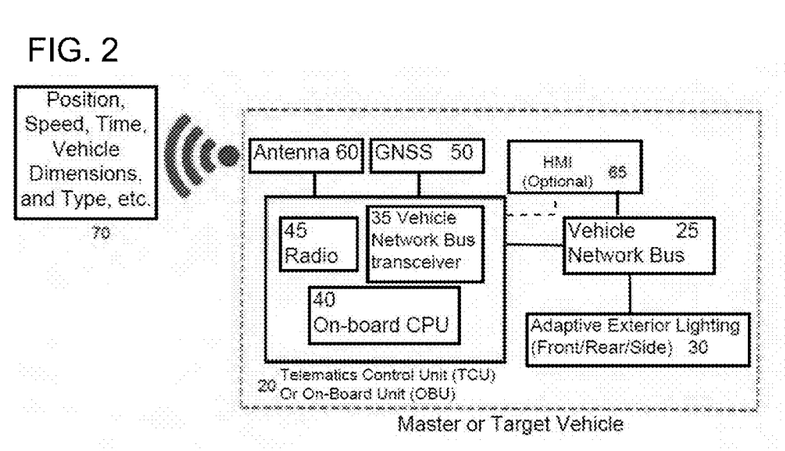
FIG. 2 illustrates one form of one embodiment of the invention.

FIG. 2 illustrates an exemplary TCU 20. Block 25 represents the vehicle network bus which, among other functions, such as vehicle state, delivers control signals to the adaptive exterior lighting 30, for example, to adjust the lighting as described herein. Block 30 represents the lights themselves, plus the electrical, or electro-mechanical, systems (or both) which adjust the light projected and even the on/off capability of the whole lighting system or select sub-lighting modules within the lighting system. The TCU 20 also delivers signals to the network bus 25 by way of the vehicle network bus transceiver 35.

Those signals are produced by the on-board CPU 40 (Central Processing Unit), which performs the computation described herein. The CPU 40 receives part of its input from a radio 45, which receives and transmits the message packets described herein. The radio 45 can be a single channel or multiple channel radio. Block 50 represents a GNSS, Global National Satellite System, receiver module which is a type of GPS or Global Positioning System, which produces the (X, Y) coordinates described herein and delivers them to the CPU 40. The GNSS module (50) also includes a dedicated single or multiple GPS antenna.

Antenna 60 transmits and receives the radio frequency signals required by the radio. The antenna 60 can be a single or multiple antenna. Block 65 represents a Human-Machine Interface, HMI, which can be through the instrument panel cluster, center stack, or other device by which a user can interact with the adaptive lighting system, including its on/off status. Block 65 can also have a direct link to TCU 20 for user interface.

Block 70 represents a message packet transmitted by the TCU 20. The packet 70 can include one or more of the following:

(1) position of the TCU 20 (i.e., the (X, Y) coordinates),
(2) speed of the vehicle carrying the TCU,
(3) characteristics of the vehicle carrying the TCU 20, such as vehicle type, dimensions, weight, model and the like;
(4) in the case of the TCU-IC, which is stationary, locations of associated hazards and identities of the hazards;
(5) a recommended adjustment of the lights of approaching vehicles, and
(6) Approaching intersection with traffic lights, thus transmitting signal phase and time (SPAT) for synchronized lighting beam distribution and intensity.

As to item (5) above, such a recommendation may be redundant in the case of ordinary vehicles approaching each other. That is, the TCU's in such vehicles would both know how lights should be re-adjusted upon meeting an approaching vehicle. However, assume that one of the vehicles is an emergency vehicle, such as an ambulance, which exhibits flashing lights or a police vehicle traveling toward a disaster. A TCU in the emergency vehicle may transmit signals which suggest that nearby vehicles within a certain distance on the roadway ahead of the emergency vehicle, such as ½ mile, actuate their emergency flashers. This would serve to warn other vehicles, located within V2X communication range, of the presence of an active emergency vehicle which those other vehicles cannot presently see.

Figure 9:
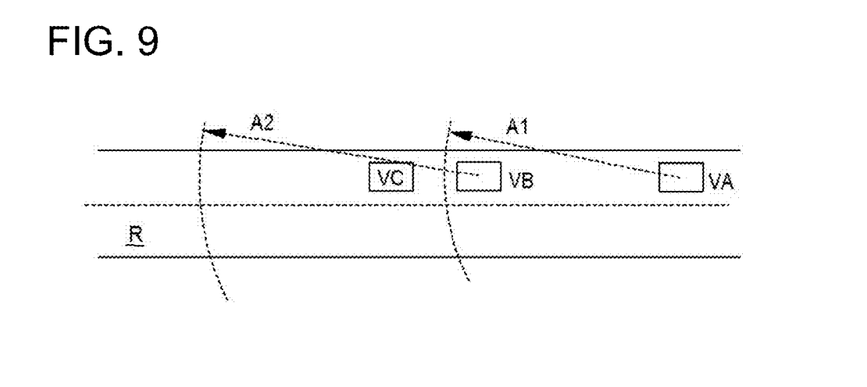
FIG. 9 illustrates a vehicle VB re-transmitting a signal received from vehicle VA, to effectively increase the signal range of vehicle VA from A1 to A2.

In addition, TCU's may re-transmit the data packet to further increase the reception range. For example, FIG. 9 shows an emergency vehicle VA. Arrow A1 indicates the 300 meter transmission range. Vehicle VB may re-transmit the packet received from vehicle VA, with an addendum indicating that the packet is not an original packet, but a re-transmitted copy. That packet will be received by vehicles within the range A2, such as vehicle VC. The TCU (not shown) of vehicle VC may be designed to only re-transmit original packets and not to re-transmit packets indicating that they are re-transmitted copies. In this case, the notice of the presence of the emergency vehicle will not spread farther than arrow A2. On the other hand, the TCU of vehicle VC may be adapted or designed to re-transmit first copies of the original and possibly copies of first copies (i.e., second copies) and so on. In this manner, a cascade of re-transmissions can occur, effectively increasing the range A1. Again, this would allow additional vehicles, which cannot presently see the emergency vehicle, to issue flashing lights, in response to receipt of re-transmitted copies of the packet originating with emergency vehicle VA.

Figure 3:
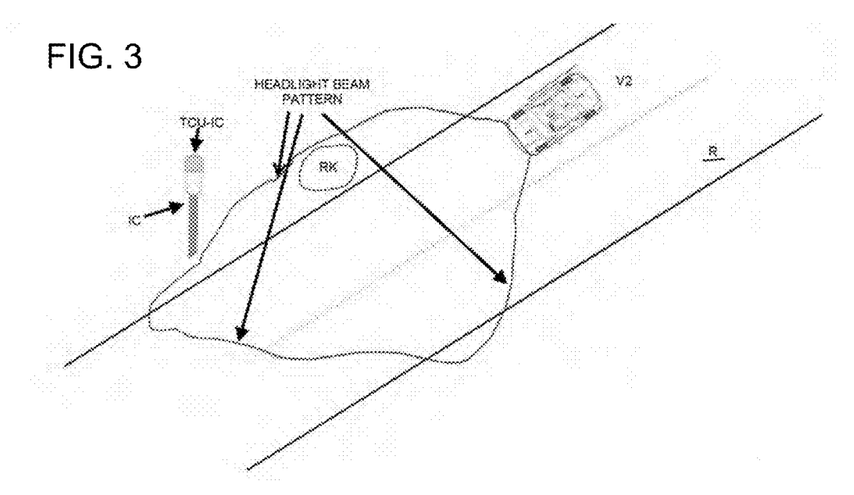
Figure 4:
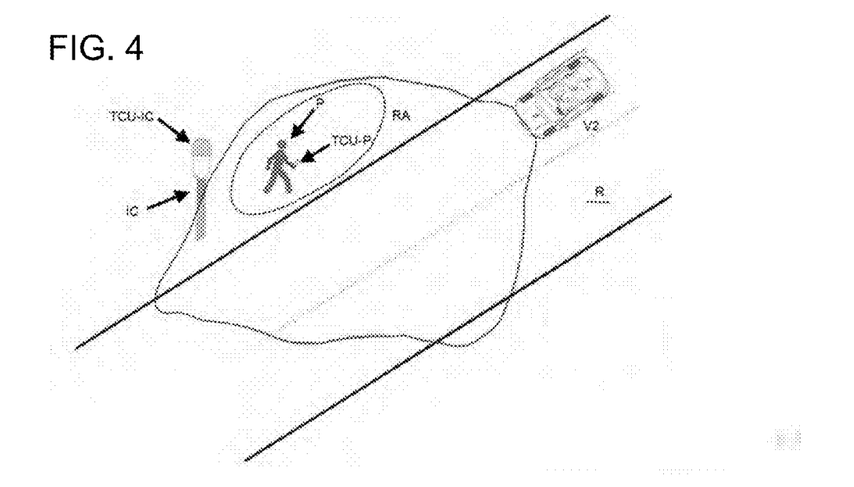
Figure 5:
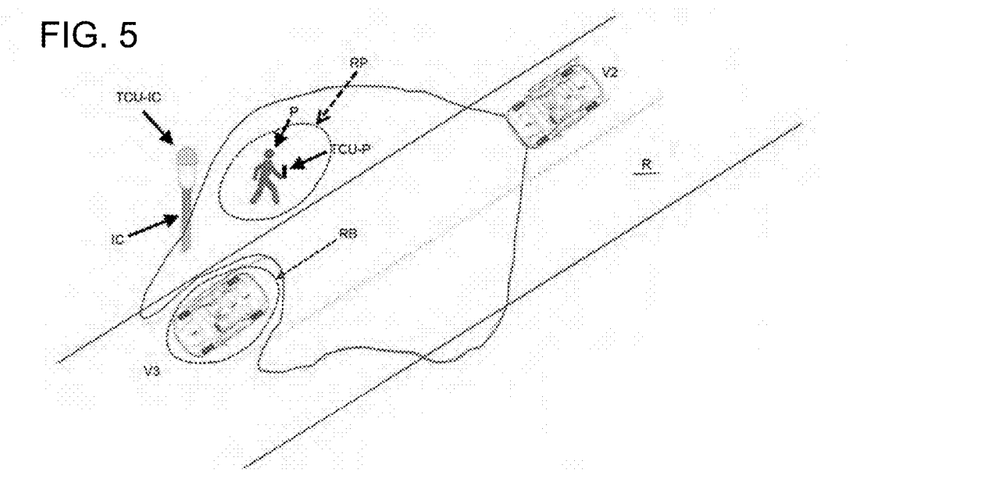

Alternately, the TCU-IC in FIG. 1 can be equipped with a receiver and be connected to a central station CS, which controls other TCU-IC's, such as those in FIGS. 3-5. The emergency vehicle VA in FIG. 9 can transmit its packet to a nearby TCU-IC, which then prompts the central station CS to cause other TCU-IC's to repeat the packet, to thereby increase the effective range A1 in FIG. 9.

FIG. 3 illustrates one scenario in which the invention operates. Vehicle V2 receives no transmissions from nearby vehicles, nor from any pedestrians, because no vehicles or pedestrians are within range. Any lighting adjustment within the vehicle is influenced by the TCU-IC infrastructure unit. For example, if an animal crossing is located at the TCU-IC, the latter issues a signal to vehicle V2, inducing the vehicle's headlights to switch to their high beams.

As another example, if a deer crossing is located at the TCU-IC, it is known that deer or other animals travel in packs. So the presence of a deer on the roadway R indicates the probable presence of other deer nearby. Further, the presence of a deer adjacent the roadway R is considered to be a hazard, because of the likelihood that the deer will bolt onto the road. Thus, the TCU-IC can issue a signal prompting the vehicle V2 to widen its headlight beams, to illuminate region RK, along the shoulders of the roadway R, which region is normally not illuminated.

FIG. 4 illustrates a second scenario. The infrastructure unit TCU-IC functions as described herein. No vehicles are within range of vehicle V2, so vehicle V2 receives no transmissions from vehicles. Pedestrian P is present, and his TCU-P issues a signal. In response, vehicle V2 broadens its headlight beams in the direction of the pedestrian, illuminating region R, which is not normally illuminated. When vehicle V2 passes pedestrian P, vehicle V2 resumes its previous illumination mode, as if pedestrian P is not present ahead of the vehicle, which he is not at that time.

FIG. 5 illustrates a third scenario, wherein vehicle V2 follows vehicle V3, in the same lane as vehicle V3. The infrastructure unit TCU-IC operates in the normal manner, and both vehicles respond accordingly, if a response is required. Pedestrian P is present, and his TCU-P issues a signal. In response, vehicle V2 broadens its headlight beams in the direction of the pedestrian, illuminating region RP, which is not normally illuminated.

In addition, vehicle V2 detects the presence of vehicle V3, closer than a predetermined distance from vehicle V2. Because of this reduced distance, vehicle V2 energizes it steerable headlights and steers its headlights away from vehicle V3, reducing illumination in region RB, which would otherwise normally be illuminated. When vehicle V3 moves outside the predetermined distance, vehicle V2 resumes illumination of region RB in the normal manner.

Figure 6:
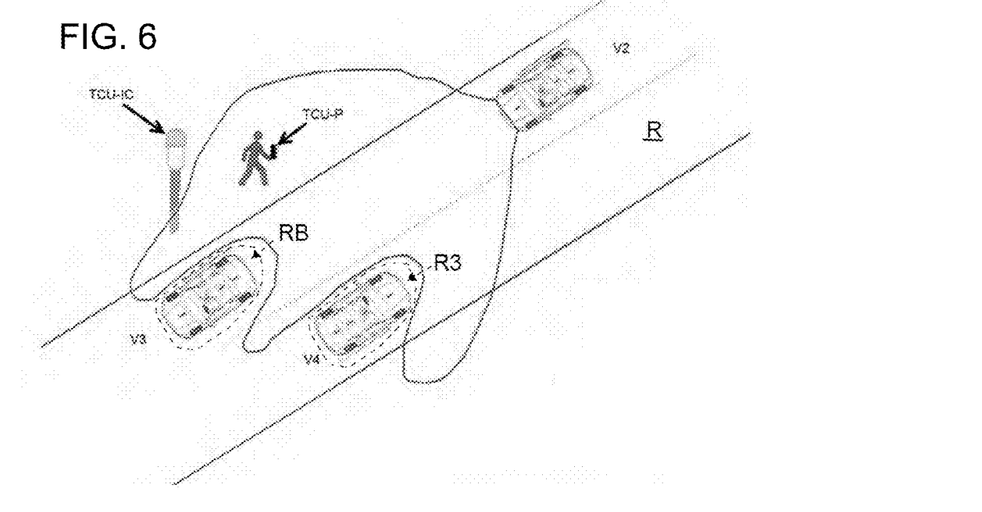

FIG. 6 illustrates a fourth scenario, which is identical to that of FIG. 5, with the exception that, in FIG. 6, an oncoming vehicle V4 is detected to be located within the predetermined distance from vehicle V2. The response of vehicle V2 is identical to that as in FIG. 5, with the addition that vehicle V2 steers its headlight beam away from oncoming vehicle V4, to reduce illumination in region R3. When vehicle V4 comes alongside vehicle V2, or passes vehicle V2, the latter resumes normal illumination of region R3.

Figure 7:
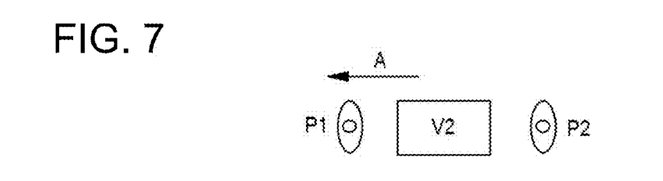
FIG. 7 illustrates two pedestrians P1 and P2, adjacent a vehicle.

It is emphasized that a vehicle does not respond to the mere proximity of an entity, such as pedestrian P, but the entity must be present at a specific location, relative to the vehicle. For example, in FIG. 7, pedestrians P2 and P3 are located at equal distances from vehicle V. However, since the TCU's of those pedestrians transmit the (X, Y) coordinates of the pedestrians, vehicle V can ascertain which pedestrian is in front of vehicle V2. It should be noted that the computed relative speed between vehicle and pedestrian, combined with the corresponding (X,Y) coordinates, can be used to judge if pedestrian is in front or behind the vehicle. FIG. 7 provides a simplified example. Assume that the vehicle is traveling in the direction of arrow A. Assume that pedestrians P1 and P2 are equidistant from the vehicle V2. The TCU (shown in FIG. 1) present in vehicle V2 can ascertain that pedestrian P1 is in front of the vehicle V2, and thus should induce a change in headlight projection. This is ascertained based on the (X, Y) coordinates received from pedestrian P1.

Figure 10:
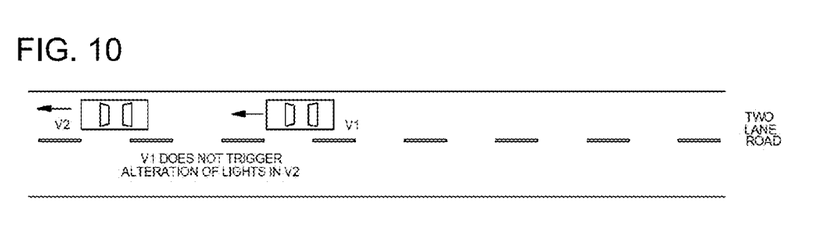
FIG. 10 illustrates other features of an embodiment of the invention.

Similarly, the TCU deduces that pedestrian P2 is located behind the vehicle V2, and should induce no headlight change. This is also true for vehicles. For example, if vehicle V1 is driving behind Vehicle V2, Vehicle V1 should induce no change of V2 headlights as shown in FIG. 10

ADDITIONAL CONSIDERATIONS

The term pedestrian is taken as generic. It can include bicyclists, people in wheelchairs, people pushing baby strollers, children on skateboards, cross-country skiers, and so on.

In one form of one embodiment of the invention, additional illumination is directed toward a specific location, such as region RA in FIG. 4, to illuminate the pedestrian P. This additional illumination can be accomplished by (1) shifting the projection axis of one or more headlights toward that region, or (2) increasing the intensity of a light already directed toward that region or (3) illuminating one or more additional lights directed toward that region, or some combination of (1), (2), and (3), and other approaches are possible.

In FIG. 8, angle theta will change as the vehicle V2 passes the pedestrian P. In one form of the invention, the newly illuminated region RA in FIG. 4 is caused to sweep rearward (relative to the vehicle), to maintain the illuminated region RA upon the pedestrian P. This sweep will be brief. For example, if the vehicle is traveling at 30 mph, it is covering 44 feet per second. If the pedestrian is 3×44 feet ahead of the vehicle, the vehicle will reach the pedestrian in approximately 3 seconds, so the sweep will likewise require 3 seconds.

In one form of the invention, illumination zones, such as RP and RB in FIG. 5, are defined with respect to the vehicle. These zones are selectively illuminated and darkened, as by removing illumination, in response to radio signals received from nearby TCU's. The selective illumination and darkening is done automatically, through control by the CPU 40 in FIG. 2, and without involvement of a human in the vehicle. It should be understood that ADB lighting system 30 might include its own CPU based on message sent by CPU 40.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

The radio can have single or multiple channels. An information packet can be distributed among various available channels.

The antenna can be a single or multiple for signal enhancement or based on the number of radio channels.

Different types of radios in the OBU (or TCU) can be used. For example, DSRC communication is used for V2V, whereas 4G LTE, or 5G in the future, for V2I, etc.

The vehicle light pattern can change in the horizontal and vertical direction. Further, the shape of the pattern can be altered, as can the cross-sectional light distribution in the light beam. Numerous approaches can be taken to altering the light beam, including (a) mechanically swiveling a headlamp, (b) selectively illuminating an array of stationary light sources, which are projected through lenses, (c) mechanically moving the lenses of item (b), (d) some combination of items (a) through (c), and (e) other approaches.

From another perspective, adaptation of the light beam can be through intensity variation, beam reshaping, and even switch on/off of lighting or combination of all. Many current technologies are based on (a) swiveling horizontally and aiming up/down of a lamp module, (b) electro-mechanical shadowing of beam, and (c) switch on/off of lighting sub-modules, in case of solid state lighting.

In one form of the invention, a smartphone would only transmit for the purpose of cooperative adaptive lighting: It would be equipped with a V2P compatible radio transmitter and GPS module. So TCU-P not necessarily similar in sub-system content as in vehicular TCU. Also, GPS module on smartphone does not necessarily need to have very high position accuracy for the purpose of V2P lighting. Thus if it's accuracy is a typical one in today's smartphone ~5-10 m, it is OK.

A "Hazard/Weather Condition Warning" can be first transmitted by either the Infrastructure or emergency vehicle, TCU-IC, then cascaded from vehicle-to-vehicle to extend message transmit range.

Different accuracies in the computed positioning of entities can be tolerated. In some cases, one-meter accuracy will suffice. In other cases, 1.5 meter accuracy is used. For V2X, we can rely on relative position for improve position accuracy. The 1.5 m in V2V is sufficient for determining if vehicle is in same lane or adjacent ones. More precise position measurement than 1.5 m can make adaptive lighting more precise. Less precision than 1.5 m , in the range up to 3 m, can still work, but will provide less precise beam shaping, and limited adaptive beam functionalities.

For V2X we can derive relative speed based on GPS coordinates, or by utilization of vehicle speed in addition.

In one form of the invention, for V2X adaptive lighting, both relative distance, and also relative angle measurement, Theta, such as in FIG. 8 are measured. Also, relative speed is important to define motion direction. For vehicles, speed can also be provided directly from the vehicle.

In one form of the invention, a radio transmitter operates in a single one of the many wireless communication bands, such as DSRC, Cellular etc. For V2X interoperability, all radios communicate on the same frequency band, such as DSRC or others.

The approaches outlined above can be complemented by other prior art techniques, such as camera based, or even on-board range detection sensing with object classification, such as LiDAR. The computer can use these complementary measurement techniques to refine, or verity, or both refine and verify its computations based on GPS input.

In one form of the invention, a trailing vehicle located behind a leading vehicle does not trigger the leading vehicle to alter its headlight beams, because techniques like GPS position data, and other approaches, will indicate the fact that the trailing vehicle is behind the leading vehicle.

The invention is applicable to multi-lane roadways where V2 is following two, or more, vehicles which are on separate lanes.

The discussion above focused on computing distance between entities. However, not only relative distance but also relative angular position of an entity can be used to determine whether lights should be adjusted with respect to that entity. Relative speed can also help in determining whether an object is ahead, approaching, receding, or behind, and so on.

In one form of the invention, accelerating or decelerating (e.g., braking) can induce more rapid, or slower, alteration of the adaptive headlight beam. In addition, if multiple vehicles transmit signals indicating that they are actuating brakes, as in a zone where road construction is ongoing, then the reception of multiple braking indications from nearby vehicles can induce the receiver's vehicle to actuate its hazard lights. Such information can be considered analogous to that recorded in aircraft flight recorders, also called "black boxes." This information includes current operating conditions of the vehicle, such as current speed, accelerating, braking, occurrence of reversals, direction, and possibly data from the on-board computer controlling the engine, and this information can be transmitted from the vehicle, through the Vehicle Network bus, to the TCU.

It should be appreciated that FIG. 1 shows several representative dotted lines that illustrate various communicate among the various nodes, such as vehicles V1, V2, V3, V4, the pedestrian P and the infrastructure. For ease of illustration, not all lines of communication are shown, but it should be appreciated that each of the components or nodes in the system 10 may be in communication with each other.

It should be appreciated that the system 10 controls the beam shape of at least one or a plurality of the vehicles V1-V4, but does not always necessarily change the beam shape. FIG. 10 illustrates such a situation where the TCU of vehicle V1 does not trigger vehicle V2, which is the host vehicle in the illustration, to change beam shape because vehicle V1 is behind vehicle V2. This information would be obtained, for example, from the GPS information mentioned earlier.

Figure 11:
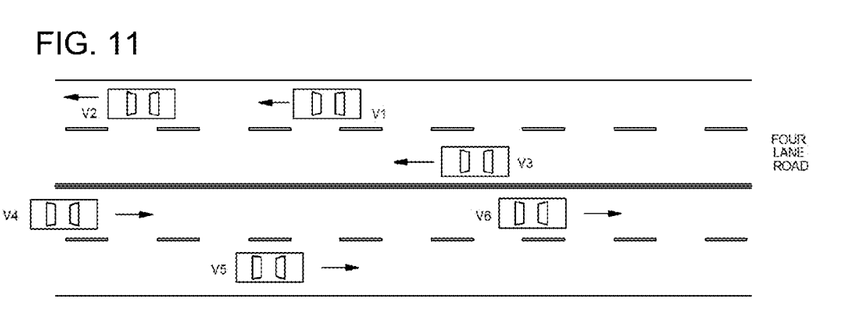
FIG. 11 illustrates an embodiment of the invention used in a multi-lane environment.

While the illustrations in the embodiments described earlier show a two-lane road, the invention is not limited to that environment and can be used with a multi-lane road or a road having more than two lanes. FIG. 11 illustrates a plurality of vehicles V1-V6 on a multi-lane road and the system 10 would operate as described earlier herein.

It should be understood that the TCU on a vehicle can come as Original Equipment (OE), that is an embedded solution, or possibly in the future as an aftermarket module, that is brought into the vehicle as a plug-in module.

Although this disclosure is assuming lighting in "visible" spectrum, it is also applicable to lighting in other spectral regions if intended for illumination while keeping in mind that the alteration of the projected beam might be different from a "visible' to a "non-visible" illumination. An example of a non-visible illumination would be infrared for night vision.

It should also be understood that there can be one, two or even multiple headlights of the type disclosed herein on the motor vehicle.

This invention, including all embodiments shown and described herein, could be used alone or together and/or in combination with one or more of the features covered by one or more of the claims set forth herein, including but not limited to one or more of the features or steps mentioned in the bullet list in the Summary of the Invention and the Claims.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. A cooperative adaptive lighting system for use in a first vehicle comprising:
   a) a transmitter which transmits first data associated with said first vehicle;
   b) a receiver which receives second data from a second vehicle and at least one of third data which indicates a location of a road hazard or infrastructure condition or fourth data associated with a pedestrian; and
   c) a computer which:
      (i) computes a parameter A for said first vehicle and said second vehicle using at least one of said first data or second data, and is also adapted to compute at least one of a parameter B for said first vehicle and said road hazard or infrastructure condition using at least one of said first data or third data or a parameter C for said first vehicle and said pedestrian using at least one of said first data or fourth data; and
      (ii) when said parameter A falls below a first predetermined threshold T1 or at least one of either said parameter B falls below a second predetermined threshold T2 or said parameter C falls below a third determined threshold T3, induces alteration of a headlight beam projected by said first vehicle,
   wherein said road hazard or infrastructure condition has a telematics control unit associated therewith for generating said thrid data and said pedestrian has a mobile device associated therewith for generating said fourth data.

2. The cooperative adaptive lighting system according to claim 1, wherein said cooperative adaptive lighting system creates at least two different light beam distributions following communication between said first vehicle and said at least one of a second vehicle, said pedestrian or said infrastructure.

3. The cooperative adaptive lighting system according to claim 1, wherein said parameter A is a distance.

4. The cooperative adaptive exterior lighting system according to claim 3, wherein said first data indicates a location of said first vehicle.

5. The cooperative adaptive exterior lighting system according to claim 4, wherein said second data indicates a location of said second vehicle.

6. The cooperative adaptive lighting system according to claim 1, wherein said parameter A is at least one of a time, an entry of a proximity zone, a strength of a signal, or a state of a vehicle.

7. The cooperative adaptive exterior lighting system according to claim 1, wherein said first data indicates a location of said first vehicle.

8. The cooperative adaptive exterior lighting system according to claim 7, wherein said second data indicates a location of said second vehicle.

9. The cooperative adaptive exterior lighting system according to claim 8, wherein said second data indicates a location of said second vehicle.

10. The cooperative adaptive exterior lighting system according to claim 1, wherein said second data indicates a location of said second vehicle.

11. The cooperative adaptive lighting system according to claim 1, wherein said transmitter is a radio transmitter.

12. The cooperative adaptive lighting system according to claim 1, wherein said second vehicle approaches said first vehicle and said alteration comprises reducing light, through decreased intensity and/or light beam reforming, which strikes said second vehicle.

13. The cooperative adaptive lighting system according to claim 1, wherein said first vehicle and said second vehicle both travel in a same direction, with said first vehicle behind said second vehicle, and said alteration comprises reducing light which strikes said second vehicle.

14. The cooperative adaptive lighting system according to claim 1, wherein said first data identifying said location of said first vehicle is obtained from an artificial earth satellite.

15. The cooperative adaptive lighting system according to claim 1 wherein each of said first vehicle, said at least one of second vehicle, said pedestrian or said infrastructure are equipped with a telematics control unit.

16. The cooperative adaptive lighting system according to claim 1, and further comprising
   d) a second receiver which receives additional data, which may be redundant to said second data, which additional data indicates a location of at least one of said second vehicle, a pedestrian or an infrastructure,
   in which said computer uses the additional data to compute or verify parameter A.

17. A cooperative adaptive lighting system for use in a first vehicle comprising:
   a) a transmitter which transmits first data associated with said first vehicle;
   b) a receiver which receives second data associated with at least one of a second vehicle, a pedestrian or an infrastructure; and
   c) a computer which;
      i) computes a parameter A for said first vehicle and said at least one of a second vehicle, said pedestrian or said infrastructure using at least one of said first data or said second data; and
      ii) when said parameter A falls below a first predetermined threshold T1, induces alteration of a headlight beam projected by said first vehicle:
   wherein said receiver receives third data from a stationary transmitter which indicates a location of a road hazard or infrastructure condition; and
   said computer computes a parameter B between said first vehicle and said road hazard or infrastructure condition and induces alteration of a headlight beam projected by said first vehicle when said parameter B falls below a second predetermined threshold T2.

18. A cooperative adaptive lighting system for use in a first vehicle comprising:
   a) a transmitter which transmits first data associated with said first vehicle;
   b) a receiver which receives second data associated with at least one of a second vehicle, a pedestrian or an infrastructure; and
   c) a computer which:
      (i) computes a parameter A for said first vehicle and said at least one of a second vehicle, said pedestrian or said infrastructure using at least one of said first data or said second data; and (ii) when said parameter A falls below a first predetermined threshold T1, induces alteration of a headlight beam projected by said first vehicle;

wherein:

1) said receiver receives fourth data from a mobile transmitter associated with a pedestrian which indicates a location of said pedestrian;
2) said computer computes a parameter C between said first vehicle and said pedestrian and induces alteration of a headlight beam projected by said first vehicle when said parameter C falls below a third predetermine threshold T3.

19. The cooperative adaptive lighting system according to claim 18, wherein said mobile transmitter is a cellular phone or other dedicated wearable device. It should also be understood that the radio transmitter in cell phone could be DSRC or other type of wireless, not necessarily cellular.

20. The cooperative adaptive lighting system according to claim 18, wherein said alteration comprises increasing illumination, through increased intensity and/or light beam reforming, which strikes said pedestrian.

21. A cooperative adaptive lighting system for use in a first vehicle comprising:
   a) a transmitter which transmits first data associated with said first vehicle;
   b) a receiver which receives second data associated with at least one of a second vehicle, a pedestrian or an infrastructure; and
   c) a computer which:
      (i) computes a parameter A for said first vehicle and said at least one of a second vehicle, said pedestrian or said infrastructure using at least one of said first data or said second data; and
      (ii) when said parameter A falls below a first predetermined threshold t1, induces alteration of a headlight beam projected by said first vehicle;
   wherein said second data is received from a government emergency vehicle and said cooperative adaptive lighting system re-transmits said second data for receipt by additional vehicles.

22. A cooperative adaptive lighting system for use in a first vehicle, comprising:
   a) a first telematics control unit which transmits first data which indicates a location of said first vehicle;
   b) said first telematics control unit receiving at least one of:
      (1) a data A indicating location of an entity A;
      (2) a data B indicating location of an entity B; or
      (3) a data C indicating location of an entity C;
   c) wherein said first telematics control unit computes at least one of:
      (1) a parameter A to said entity A;
      (2) a parameter B to said entity B; or
      (3) a parameter C to said entity C;
   said first telematics control unit including a headlight beam projected by said first vehicle in response thereto and causes at least one of the following alterations:
      i) a beam headlight alteration A when said parameter A falls below a threshold T1;
      ii) a beam headlight alteration B when said parameter B falls below a threshold T2; or
      iii) a beam headlight alteration C when said parameter C falls below a threshold T3;
   wherein said data A is generated by a telematics control unit associated with a second vehicle, said data B is generated by a telematics control unit associated with a road hazard or infrastructure condition and said data C is generated by a mobile device associated with a pedestrian.

23. The cooperative adaptive lighting system according to claim 22, wherein said beam headlight alteration A is different from said beam headlight alteration B, which is different from said beam headlight alteration C.

24. The cooperative adaptive lighting system according to claim 23, wherein said entity A is a second vehicle and said beam headlight alteration A comprises projecting an additional illumination toward said second vehicle.

25. The cooperative adaptive lighting system according to claim 23, wherein said entity B is a road hazard or infrastructure, and said beam headlight alteration B comprises reducing an illumination projected toward said road hazard or infrastructure.

26. The cooperative adaptive lighting system according to claim 25, wherein said entity A is an approaching second vehicle.

27. The cooperative adaptive lighting system according to claim 25, wherein said entity A is a second vehicle located ahead of said first vehicle and both vehicles travel in the same direction.

28. The cooperative adaptive lighting system according to claim 23, wherein said entity C is a pedestrian, and said beam headlight alteration C comprises projecting additional illumination toward said pedestrian.

29. The cooperative adaptive lighting system according to claim 23, wherein said entity C is a road hazard or driving condition, and said beam headlight alteration C comprises reducing illumination projected toward said road hazard or driving condition.

30. A cooperative adaptive lighting system for use in a first vehicle, comprising:
   a) a first telematics control unit which ascertains first coordinates (X, Y) associated with said first vehicle and transmits coordinates for reception by other vehicles;
   b) a second telematics control unit which
      i) receives second coordinates (X, Y) associated with a second vehicle;
      ii) computes a parameter A for said first vehicle and said second vehicle using said first coordinates (X, Y) and said second coordinates (X, Y);
      iii) when said parameter A falls below a first predetermined threshold, induces a change in illumination produced by lighting in said first vehicle;
   c) at least one of a third telematics control unit associated with a road hazard or infrastructure or a fourth telematics control unit or mobile device associated with a pedestrian;
   said third telematics control unit which:
      i) receives second coordinates (X, Y) associated with a road hazard or infrastructure;
      ii) computes a parameter B for said first vehicle and said road hazard or infrastructure using said first coordinates (X, Y) and said second coordinates (X, Y);
      iii) when said parameter B falls below a second predetermined threshold, induces a change in illumination produced by lighting in said first vehicle; and
   said fourth telematics control unit which:
      i) receives second coordinates (X, Y) associated with a pedestrian;
      ii) computes a parameter C for said first vehicle and said pedestrian using said first coordinates (X, Y) and said second coordinates (X, Y);

iii) when said parameter C falls below a third predetermined threshold induces a change in illumination produed by lighting in said first vehicle.

31. The cooperative adaptive lighting system according to claim 30, said parameter is a distance.

32. The cooperative adaptive exterior lighting system according to claim 31, wherein said first coordinates (X, Y) indicates a location of said first vehicle.

33. The cooperative adaptive lighting system according to claim 30, said parameter A is at least one of a time, an entry of a proximity zone, a strength of a signal, or a state of a vehicle.

34. The cooperative adaptive exterior lighting system according to claim 30, wherein said first coordinates (X, Y) indicates a location of said first vehicle.

35. The cooperative adaptive exterior lighting system according to claim 34, wherein said second coordinates (X, Y) indicates a location of said second vehicle.

36. The cooperative adaptive exterior lighting system according to claim 30, wherein said second coordinates (X, Y) indicates a location of said second vehicle.

37. The cooperative adaptive exterior lighting system according to claim 30, wherein said second coordinates (X, Y) indicates a location of said second vehicle.

38. The cooperative adaptive lighting system according to claim 30, wherein said change in illumination reduces light projected toward eyes of a driver of said second vehicle.

39. A cooperative adaptive exterior lighting system for use on a first vehicle comprising:
   an adaptive exterior lighting system;
   a control system for controlling operation of said adaptive exterior lighting system, comprising:
     a) a transmitter which transmits first data associated with said first vehicle;
     b) a receiver which receives second data from a second vehicle and at least one of third data which indicates a location of a road hazard or infrastructure condition or fourth data associated with a pedestrian; and
     c) a computer which:
       (i) computes a parameter A for said first vehicle and said second vehicle using at least one of said first data or second data, and is also adapted to compute at least one of a parameter B for said first vehicle and said road hazard or infrastructure condition using at least one of said first data or third data or a parameter C for said first vehicle and said pedestrian using at least one of said first data or fourth data; and
       (ii) when said parameter A falls below a first predetermined threshold T1 or at least one of either said parameter B falls below a second predetermined threshold T2 or said parameter C falls below a third predetermined threshold T3, induces alteration of a headlight beam projected by said adaptive exterior lighting system;
   wherein said road hazard or infrastructure condition has a telematics control unit associated therewith for generating said third data and said pedestrian has a mobile device associated therewith for generating said fourth data.

40. The cooperative adaptive exterior lighting system according to claim 39, wherein said parameter A is a distance.

41. The cooperative adaptive exterior lighting system according to claim 40, wherein said first data indicates a location of said first vehicle.

42. The cooperative adaptive exterior lighting system according to claim 41, wherein said second data indicates a location of said second vehicle.

43. The cooperative adaptive exterior lighting system according to claim 39, wherein said parameter A is at least one of a time, an entry of a proximity zone, a strength of a signal, or a state of a vehicle.

44. The cooperative adaptive exterior lighting system according to claim 39, wherein said first data indicates a location of said first vehicle.

45. The cooperative adaptive exterior lighting system according to claim 44, wherein said second data indicates a location of said second vehicle.

46. The cooperative adaptive exterior lighting system according to claim 39, wherein said second vehicle approaches said first vehicle and said alteration comprises reducing light which strikes said second vehicle.

47. The cooperative adaptive exterior lighting system according to claim 39, wherein said first vehicle and said second vehicle both travel in a same direction, with said first vehicle behind said second vehicle, and said alteration comprises reducing light which strikes said second vehicle.

48. The cooperative adaptive exterior lighting system according to claim 39, wherein said first data identifying said location of said first vehicle is obtained from an artificial earth satellite.

49. A cooperative adaptive exterior lighting system for use on a first vehicle comprising:
   an adaptive exterior lighting system;
   a control system for controlling operation of said adaptive exterior lighting system comprising:
     a) a transmitter which transmits first data associated with said first vehicle;
     b) a receiver which receives second data associated with a second vehicle; and
     c) a computer which
       (i) computes a parameter A for said first vehicle and said second vehicle using said first data and said second data; and
       (ii) when said parameter A falls below a first predetermined threshold T1, induces alteration of a headlight beam projected by said adaptive exterior lighting system:
   wherein said receiver receives third data from a stationary transmitter which indicates a location of a road hazard or driving condition; and
   said computer computes a parameter B between said first vehicle and said road hazard and induces alteration of a headlight beam projected by said first vehicle when said parameter B falls below a second predetermined threshold T2.

50. A cooperative adaptive exterior lighting system for use on a first vehicle comprising:
   an adaptive exterior lighting system;
   a control system for controlling operation of said adaptive exterior lighting system comprising:
     a) a transmitter which transmits first data associated with said first vehicle;
     b) a receiver which receives second data associated with a second vehicle; and
     c) a computer which
       (i) computes a parameter A for said first vehicle and said second vehicle using said first data and said second data; and (ii) when said parameter A falls below a first predetermined threshold T1, induces alteration of a headlight beam projected by said adaptive exterior lighting system;

wherein:

1) said receiver receives fourth data from a mobile transmitter associated with a pedestrian which indicates a location of said pedestrian;
2) said computer computes a parameter C between said first vehicle and said pedestrian and induces alteration of a headlight beam projected by said first vehicle when said parameter C falls below a third predetermined threshold T3.

51. The cooperative adaptive exterior lighting system according to claim 50, wherein said alteration comprises increasing illumination which strikes said pedestrian.

* * * * *

UNITED STATES PATENT AND TRADEMARK OFFICE
CERTIFICATE OF CORRECTION

| | | |
|---|---|---|
| PATENT NO. | : 9,731,645 B1 | Page 1 of 1 |
| APPLICATION NO. | : 15/093240 | |
| DATED | : August 15, 2017 | |
| INVENTOR(S) | : Amine Taleb-Bendiab | |

It is certified that error appears in the above-identified patent and that said Letters Patent is hereby corrected as shown below:

In the Claims

Column 15, Line 33, delete "determined" and insert --predetermined-- therefor.

Column 15, Line 37, delete "thrid" and insert --third-- therefor.

Column 17, Line 11, delete "predetermine" and insert --predetermined-- therefor.

Column 17, Line 35, delete "t1" and insert --T1-- therefor.

Column 19, Line 3, delete "produed" and insert --produced-- therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*